US011703315B2

(12) United States Patent
Dapore

(10) Patent No.: US 11,703,315 B2
(45) Date of Patent: Jul. 18, 2023

(54) LASER INTERFEROMETRY SYSTEMS AND METHODS

(71) Applicant: NDC Technologies Inc., Dayton, OH (US)

(72) Inventor: Jerome Joseph Dapore, Springboro, OH (US)

(73) Assignee: Nordson Corporation, Westlake, OH (US)

(*) Notice: Subject to any disclaimer, the term of this patent is extended or adjusted under 35 U.S.C. 154(b) by 0 days.

(21) Appl. No.: 17/025,829

(22) Filed: Sep. 18, 2020

(65) Prior Publication Data

US 2021/0088320 A1    Mar. 25, 2021

Related U.S. Application Data

(60) Provisional application No. 62/903,310, filed on Sep. 20, 2019.

(51) Int. Cl.
*G01B 9/02* (2022.01)
*G01B 9/02015* (2022.01)
(Continued)

(52) U.S. Cl.
CPC ..... *G01B 9/02045* (2013.01); *G01B 9/02015* (2013.01); *G01B 9/02034* (2013.01);
(Continued)

(58) Field of Classification Search
CPC ............ G01B 9/02015; G01B 9/02034; G01B 9/02045; G01B 9/02056; G01P 3/36; G01P 3/363; G01P 3/366; G01S 17/58
(Continued)

(56) References Cited

U.S. PATENT DOCUMENTS 4,537,503 A * 8/1985 Liu ........................... G01P 5/26
356/28
4,679,932 A * 7/1987 Morishita ............ B65H 61/005
356/27
(Continued)

FOREIGN PATENT DOCUMENTS

CN    203830424 U    9/2014
CN    105149775 B    7/2018
(Continued)

OTHER PUBLICATIONS

International Search Report and Written Opinion dated Dec. 18, 2020, directed to International Application No. PCT/US2020/051440; 17 pages.
(Continued)

*Primary Examiner* — Michael A Lyons
(74) *Attorney, Agent, or Firm* — Squire Patton Boggs (US)

(57) ABSTRACT

Provided are systems and methods for using laser interferometry to measure moving objects. Systems provided include laser interferometry systems comprising: a laser emitter configured to emit a laser beam; a beam splitter configured to split the emitted laser beam into a first split beam directed towards a deflector and a second split beam, wherein the first split beam comprises a first beam diameter and a second beam diameter, the first beam diameter being greater than the second beam diameter, and the second split beam comprises a third beam diameter and a fourth beam diameter, the third split beam diameter being greater than the fourth beam diameter; and a deflector configured to deflect the first split beam to intersect with the first split beam, wherein the first beam diameter and the third beam diameter are parallel.

31 Claims, 4 Drawing Sheets

(51) Int. Cl.
  *G01B 9/02056* (2022.01)
  *G02B 27/10* (2006.01)
  *G01P 3/36* (2006.01)
  *G02B 3/06* (2006.01)
  *G01S 17/58* (2006.01)

(52) U.S. Cl.
  CPC .......... *G01B 9/02056* (2013.01); *G01P 3/366* (2013.01); *G02B 27/1006* (2013.01); *G01S 17/58* (2013.01); *G02B 3/06* (2013.01)

(58) Field of Classification Search
  USPC ........................................................ 356/28.5
  See application file for complete search history.

(56) References Cited

U.S. PATENT DOCUMENTS

| | | | | |
|---|---|---|---|---|
| 6,088,102 | A * | 7/2000 | Manhart | G02B 26/02 356/499 |
| 7,297,898 | B2 | 11/2007 | Zeller et al. | |
| 7,304,815 | B2 | 12/2007 | Chapman et al. | |
| 9,229,024 | B2 | 1/2016 | Carpaij et al. | |
| 10,120,059 | B2 | 11/2018 | Hara | |
| 10,156,432 | B1 * | 12/2018 | Schmieder | G01J 3/4537 |
| 2006/0066867 | A1 * | 3/2006 | Beausoleil | G02B 6/12004 356/481 |
| 2010/0017166 | A1 * | 1/2010 | Moir | G01P 5/20 702/142 |
| 2015/0331004 | A1 * | 11/2015 | Ghai | G01P 3/36 356/28.5 |
| 2019/0128916 | A1 * | 5/2019 | Ota | G01P 3/36 |

FOREIGN PATENT DOCUMENTS

| | | |
|---|---|---|
| CN | 108519495 A | 9/2018 |
| JP | H8-21849 A | 1/1996 |
| JP | H11-64521 A | 3/1999 |
| JP | 2009288217 A * | 12/2009 |
| JP | 2017-83467 A | 5/2017 |

OTHER PUBLICATIONS

Ishida et al. (Sep. 2009) "Three-dimensional imaging techniques for microvessels using multipoint laser Doppler velocimeter," Journal of Applied Physics 106(5): 6 pages.

Livingstone et al. (1993). "Development of a Real-Time Laser Scanning System for Object Recognition, Inspection, and Robot Control," Telemanipulator Technology and Space Telerobotics 2057: 454-461.

* cited by examiner

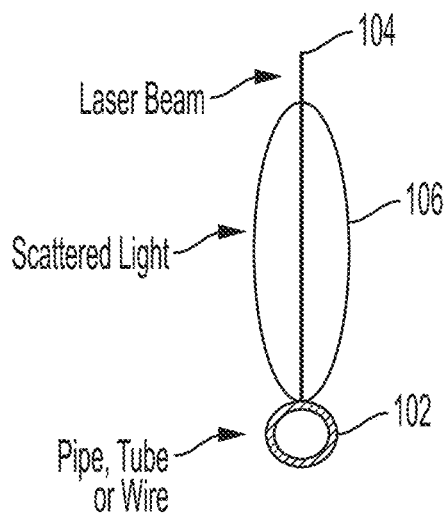
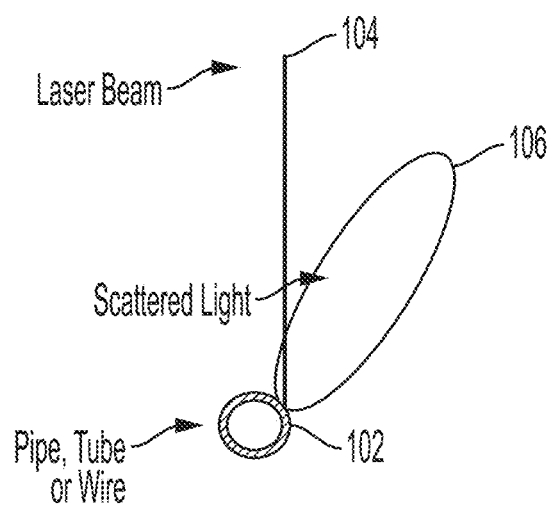
FIG. 1A
Prior Art
FIG. 1B
Prior Art
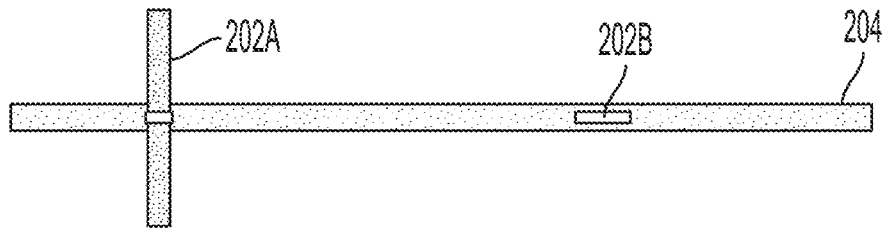
FIG. 2A
Prior Art
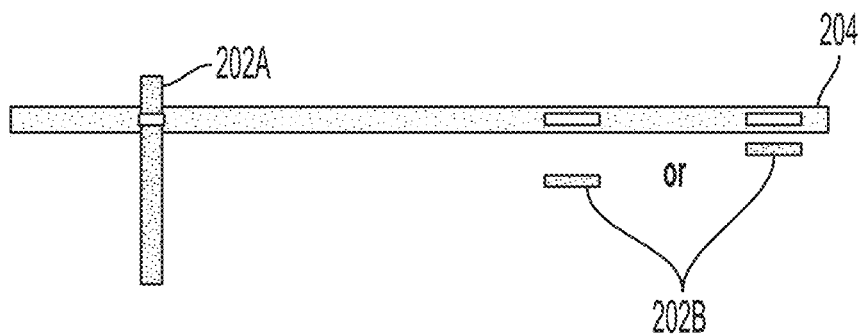
FIG. 2B
Prior Art

LASER INTERFEROMETRY SYSTEMS AND METHODS

CROSS-REFERENCE TO RELATED APPLICATION

This application claims the benefit of U.S. Provisional Application No. 62/903,310, filed Sep. 20, 2019, the entire contents of which are incorporated herein by reference.

FIELD

This disclosure relates to methods of measuring moving objects using laser interferometry, and more particularly, to methods of using laser interferometry to obtain reliable and accurate measurements of moving objects.

BACKGROUND

Laser interferometry can be used to measure velocities or lengths of moving objects. Laser interferometry uses two laser beams that converge at a surface of a moving object, forming an intersecting area. The moving object reflects light within the intersected area (or depth of field). This reflected light is detected by a light detector, and, using a Doppler effect, can determine a velocity and/or length of the moving object. Accurate measurements may rely on one or more of the following properties: object color, object texture, angle of presentation, object reflectivity or absorptive properties, cleanliness of the laser path between the laser surface velocimeter and the object, the object composition, etc.

Laser surface velocimeters are instruments that use the Doppler shift in a laser beam (i.e., the reflected light from the surface of the moving object) to measure the velocity of the moving object. In particular, laser surface velocimeters cross two beams of collimated, monochromatic, and coherent laser light at a moving object to be measured. A transmitting optics directs the beams to intersect at a defined distance, where the two beams interfere and generate a set of fringes. As the moving object passes through the fringes, it reflects light that is then collected by a receiving optics and focused on a photo detector.

SUMMARY

Provided are laser interferometry systems and methods of using laser interferometry to measure moving objects. Systems and methods provided herein can measure various characteristics of a moving object, such as its velocity. To obtain more accurate measurements, systems and methods provided herein can include a larger effective measurement area than that of conventional laser interferometry systems and methods, described above. Specifically, a larger effective measurement area can be achieved by rotating the orientation of the elliptical laser beam profile, by elongating one or more axes of the elliptical profile, and/or by using a smaller convergence angle.

Conventional methods of using laser interferometry as described above are particularly deficient at capturing accurate measurements of moving objects that have a small cross-sectional area. Because such objects have a very small reflective area to produce good measurements (e.g., the crown of a object having a circular cross-sectional area), the exact position of the laser is crucial to achieving accurate measurements. Thus, it is often difficult to receive sufficient light reflected back from the moving object to obtain accurate measurements. In particular, objects that have a small cross-sectional area, objects that rapidly change position (in a direction other than the velocity direction), and objects that, due to the nature of the manufacturing process cannot be guided, are typically difficult to measure accurately using conventional laser interferometry.

Disclosed herein are methods of accurately measuring such objects (e.g., objects that have a small cross-sectional area, that rapidly change position, and that due to the nature of the manufacturing process cannot be guided). Specifically, methods provided herein comprise (1) rotating the laser to increase the effective measurement area; (2) expanding the laser beam along one or more axes; and (3) minimizing the convergence angle to obtain a longer depth of field. Each of these features is described in detail below.

In some embodiments, a laser interferometry system is provided, the system comprising: laser emitter configured to emit a laser beam; a beam splitter configured to split the emitted laser beam into a first split beam directed towards a deflector and a second split beam, wherein the first split beam comprises a first beam diameter and a second beam diameter, the first beam diameter being greater than the second beam diameter, and the second split beam comprises a third beam diameter and a fourth beam diameter, the third split beam diameter being greater than the fourth beam diameter; and a deflector configured to deflect the first split beam to intersect with the second split beam, wherein the first beam diameter and the third beam diameter are parallel.

In some embodiments of the system, the first beam diameter and the third beam diameter are equal and the second beam diameter and the fourth beam diameter are equal.

In some embodiments of the system, the first split beam and the second split beam intersect at an angle of less than 60 degrees.

In some embodiments of the system, the emitted laser beam comprises a fifth beam diameter and a sixth beam diameter, the fifth beam diameter being greater than the sixth beam diameter, and at least one of the fifth beam diameter or the sixth beam diameter is increased by passing the emitted laser beam through a cylindrical lens.

In some embodiments of the system, the first beam diameter is at least three times greater than second beam diameter, and the third beam diameter is at least three times greater than the fourth beam diameter.

In some embodiments of the system, the system comprises a processor, a memory, and instructions stored on the memory configured to cause the system to calculate a velocity of an object moving through the intersecting area.

In some embodiments of the system, the calculated velocity is in a direction orthogonal to the first beam diameter and the third beam diameter.

In some embodiments of the system, the object comprises a cord, wire, rod, or a flat sheet of paper or plastic.

In some embodiments, a laser interferometry system is provided, the system comprising: a laser emitter configured to emit a laser beam; a beam splitter configured to split the emitted laser beam into a first split beam directed towards a deflector and a second split beam, wherein the first split beam comprises a first beam diameter and a second beam diameter, the first beam diameter being greater than the second beam diameter, and the second split beam comprises a third beam diameter and a fourth beam diameter, the third split beam diameter being greater than the fourth beam diameter; and a deflector configured to deflect the first split beam to intersect with the second split beam, wherein the emitted laser beam comprises a fifth beam diameter and a sixth beam diameter, the fifth beam diameter being greater than the sixth beam diameter, and at least one of the fifth beam diameter or the sixth beam diameter is increased by passing the emitted laser beam through a cylindrical lens.

In some embodiments of the system, the first beam diameter and the third beam diameter are parallel.

In some embodiments of the system, the first beam diameter and the third beam diameter are equal and the second beam diameter and the fourth beam diameter are equal.

In some embodiments of the system, the first split beam and the second split beam intersect at an angle of less than 60 degrees.

In some embodiments of the system, the first beam diameter is at least three times greater than second beam diameter, and the third beam diameter is at least three times greater than the fourth beam diameter.

In some embodiments of the system, the system comprises a processor, a memory, and instructions stored on the memory configured to cause the system to calculate a velocity of an object moving through the intersecting area.

In some embodiments of the system, the calculated velocity is in a direction orthogonal to the first beam diameter and the third beam diameter.

In some embodiments of the system, the object comprises a cord, wire, rod, or a flat sheet of paper or plastic.

In some embodiments, a laser interferometry system is provided, the system comprising: a laser emitter configured to emit a laser beam; a beam splitter configured to split the emitted laser beam into a first split beam directed towards a deflector and a second split beam, wherein the first split beam comprises a first beam diameter and a second beam diameter, the first beam diameter being greater than the second beam diameter, and the second split beam comprises a third beam diameter and a fourth beam diameter, the third split beam diameter being greater than the fourth beam diameter; and a deflector configured to deflect the first split beam to intersect with the second split beam, wherein the first split beam and the second split beam intersect at an angle of less than 60 degrees.

In some embodiments of the system, the first beam diameter and the third beam diameter are equal and the second beam diameter and the fourth beam diameter are equal.

In some embodiments of the system, the first split beam and the second split beam intersect at an angle of less than 20 degrees.

In some embodiments of the system, the first beam diameter and the third beam diameter are parallel.

In some embodiments of the system, the emitted laser beam comprises a fifth beam diameter and a sixth beam diameter, the fifth beam diameter being greater than the sixth beam diameter, and at least one of the fifth beam diameter or the sixth beam diameter is increased by passing the emitted laser beam through a cylindrical lens.

In some embodiments of the system, the first beam diameter is at least three times greater than second beam diameter, and the third beam diameter is at least three times greater than the fourth beam diameter.

In some embodiments of the system, the system comprises a processor, a memory, and instructions stored on the memory configured to cause the system to calculate a velocity of an object moving through the intersecting area.

In some embodiments of the system, the calculated velocity is in a direction orthogonal to the first beam diameter and the third beam diameter.

In some embodiments of the system, the object comprises a cord, wire, rod, or a flat sheet of paper or plastic.

BRIEF DESCRIPTION OF THE DRAWINGS

Various embodiments are described with reference to the accompanying figures, in which:

FIGS. 1A and 1B each depict a laser beam reflecting off of a moving object, according to some embodiments;

FIGS. 2A and 2B each depict a schematic of laser beam orientations used to measure moving objects, according to some embodiments;

DETAILED DESCRIPTION

Figure 3:
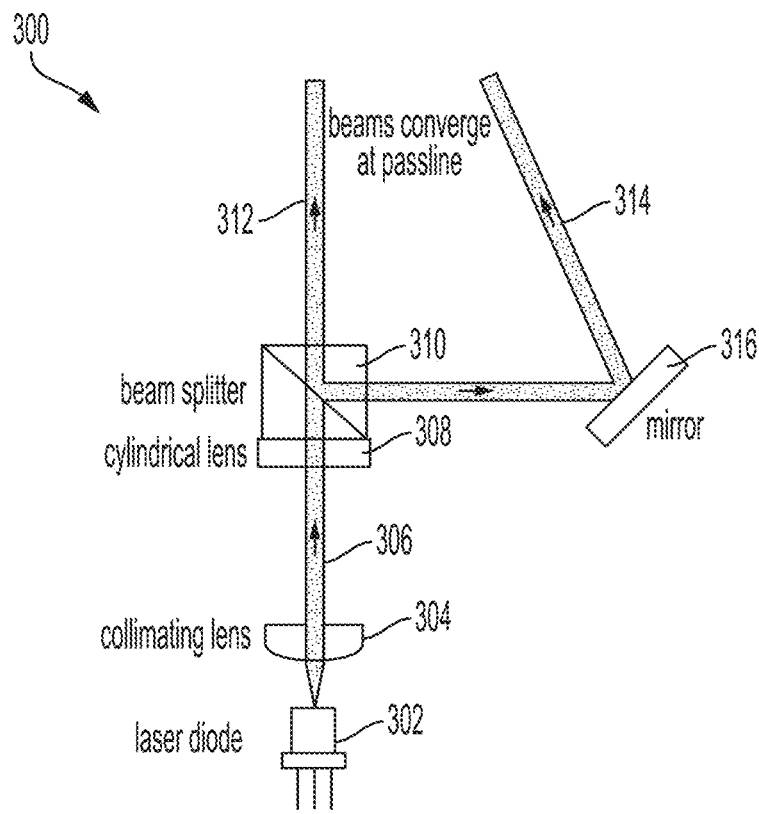
FIG. 3 shows a top view of a laser surface velocimeter, according to some embodiments.

Described herein are laser interferometry systems and methods of using laser interferometry to measure moving objects. Specifically, the methods described herein are used to obtain more reliable and accurate measurements of such objects. For example, measurements that may be obtained using systems and methods described herein can include measurements related to the movement of such moving objects for the purpose of process control, velocity monitoring, control and verification of cut lengths, and thickness control.

Laser interferometry obtains measurements by using the separation of laser energy into two beams using a beam splitter. The split beams are then recombined, or intersected. The measured object reflects light within the area that the split beams are intersected, called a depth of field. Accurate measurements may rely on one or more of the following properties: object color, object texture, angle of presentation, object reflectivity or absorptive properties, cleanliness of the laser path between the laser surface velocimeter and the object, and the object composition.

Conventional methods of measuring moving objects have difficulty obtaining reliable and accurate measurements due to the small reflective area on the surface of the object. Additionally, these methods are designed such that the laser surface velocimeter is stationary and measures a velocity of the moving object in an X-axis. However, even though the object is moving in an X-axis, the position of the moving object will invariably fluctuate in directions of a Y- and in a Z-axis as well. Thus, this small reflective area, coupled with the movement of the object in the Y- and Z-axes, can lead to inaccurate, unreliable, or a lack of measurements.

FIGS. 1A and 1B illustrate the difficulty of measuring moving objects with conventional methods. Both figures show a cross-section of object 102 traveling in a direction that extends into and out of the page. As shown in FIG. 1A, laser beam 104 is directed right on the crown of object 102, such that the reflected, or scattered light 106 is directed back in the path of laser beam 104. However, FIG. 1B shows that object 102 has moved slightly to the left, such that laser beam 104 is directed not on the crown of object 102, but on a side surface of object 102. Thus, the reflected, or scattered light 106 is directed out to an angle that does not intersect with the path of laser beam 104. Accordingly, assuming that scattered light 106 needs to be directed back in the direction of the laser beam 104 to be detected by a detector, the scattered light 106 of FIG. 1B cannot be received/detected to obtain accurate measurements. Thus, even slight movement of object 102 can prevent a laser surface velocimeter from obtaining reliable and accurate measurements.

FIGS. 2A and 2B also show how conventional laser surface velocimeters, and particularly, the effective measurement area of conventional laser surface velocimeters, can be unreliable. In particular, FIG. 2A shows a moving object 204 configured to linearly move in an X-axis direction (i.e., left or right). Laser beam profile 202A depicts a laser beam profile consistent with systems and methods described herein. Laser beam profile 202B depicts a non-rotated laser beam profile consistent with conventional measurement systems. When moving object 204 is centered with respect to laser beam profiles 202A and 202B, both the conventional system (i.e., laser beam profile 202B) and the systems described herein (i.e., laser beam profile 202A) can obtain accurate measurements.

However, FIG. 2B shows the difficulties posed when using conventional measurement methods. As shown, moving object has shifted slightly in a Y-axis direction such that it is not perfectly centered with respect to laser beam profiles 202A and 202B. Accordingly, conventional measurement methods (i.e., laser beam profile 202B) are incapable of accounting for this shift and obtaining an accurate measurement. However, systems and methods provided herein (i.e., laser beam profile 202A) are more capable of obtaining accurate measurements, since laser beam profile 202A is still directed at the crown of moving object 204, even when the object shifts.

Systems and methods described herein include a larger intersecting, or effective measurement area (i.e., where the two laser beams intersect) that can allow for more reliable and accurate measurements of moving objects. Systems and methods described herein utilize a laser surface velocimeter for measuring. Specific features of the systems and methods provided that may be implemented to form a larger effective measurement area comprise (1) rotating the laser beam profile; (2) expanding the laser beam in one or more axes; and (3) creating a longer depth of field. Provided below is a description of a laser surface velocimeter as used for systems and methods provided herein, in addition to a detailed description of each of the above-enumerated features of the measuring methods described herein.

Laser Surface Velocimeter

In addition to methods for measuring moving objects, also provided herein are laser surface velocimeters (i.e., laser interferometry systems) that can be used with measurement methods provided herein. Provided below is a description of laser surface velocimeters.

FIG. 3 provides a top view configuration of laser surface velocimeter 300 according to some embodiments provided herein. As shown in the figure, laser surface velocimeter 300 can include laser diode 302, collimating lens 304, emitted laser beam 306, cylindrical lens 308, beam splitter 310, transmitted laser beam 312, deflected laser beam 314, and mirror 316.

Figure 4:
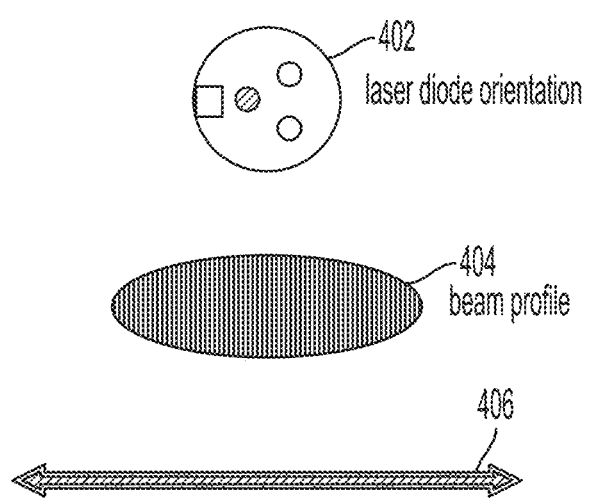
FIG. 4 shows features of a laser surface velocimeter, according to some embodiments.

In some embodiments, laser diode 302 may be rotated with respect to the laser diode of a conventional laser surface velocimeter to generate a rotated laser beam profile. For example, FIG. 4 shows a conventional laser beam diode 402, a conventional laser beam profile 404, and moving object 406. In this conventional configuration, the length of laser beam profile 404 is parallel to the direction of movement of moving object 406.

Figure 5:
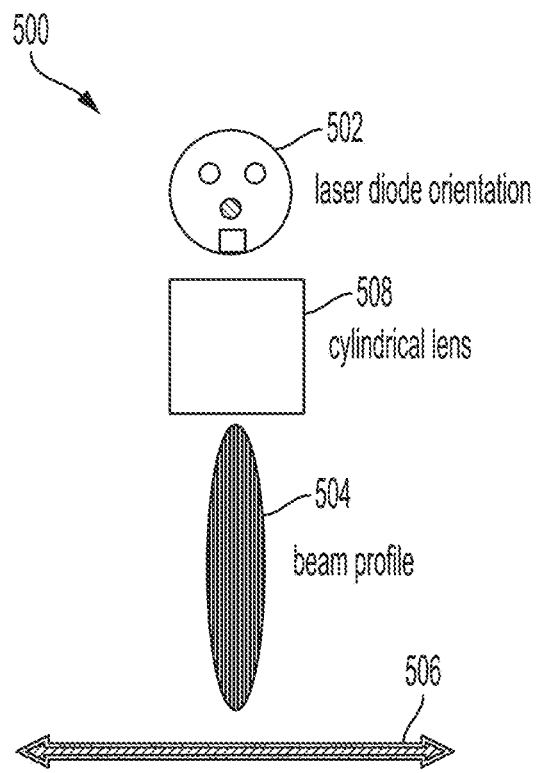
FIG. 5 shows features of a laser surface velocimeter, according to some embodiments.

In contrast, FIG. 5 shows a configuration of a laser surface velocimeter 500 according to some embodiments. Laser surface velocimeter 500 can include laser diode 502, laser beam profile 504, and moving object 506. Cylindrical lens 508 may also be included to expand a length or width of laser beam profile 504, as described in more detail below.

As shown in FIG. 5, laser diode 502 is rotated 90 degrees with respect to laser diode 402 of FIG. 4. By rotating laser diode 502, laser beam profile 504 is rotated. By rotating laser diode 502 to generate a rotated laser beam profile 504, the effective measurement area of the laser beam may be increased.

Laser surface velocimeter 300 of FIG. 3 also includes collimating lens 304. Collimating lens 304 is an optical lens that help to narrow the laser beam and/or align the beam as desired.

Laser surface velocimeter 300 can also include a cylindrical lens 308, in some embodiments (or any other means for expanding a laser beam diameter). A cylindrical lens, such as the cylindrical lens 308 of FIG. 3, is a lens that can either expand or compress light in a one or more directions. In some embodiments, cylindrical lens 308 may be used to expand laser beam profile 304 in a specific direction. For example, cylindrical lens 308 may be used to expand laser beam profile 304 in a direction along a Y-axis. More details related to the cylindrical lens and expansion of the laser beam profile are provided below.

In some embodiments, laser surface velocimeter 300 may include beam splitter 310. A beam splitter is an optical device that can split a beam of light into two. As shown in FIG. 3, beam splitter 310 can split collimated laser beam 306 into two separate laser beams—transmitted laser beam 312 and deflected laser beam 314. In some embodiments, transmitted laser beam 312 and deflected laser beam 314 may diverge from beam splitter 310 at an angle from 30 to 90 degrees. In some embodiments, the size and/or shape of the profile of transmitted laser beam 312 and deflected laser beam 314 may be the same.

In some embodiments, laser surface velocimeter 300 may include mirror 316. Mirror 316 can be used to deflect deflected laser beam 314. In particular, mirror 316 may be configured to deflect deflected laser beam 314 such that transmitted laser beam 312 and deflected laser beam 314 converge at a surface of the moving object. In some embodiments, laser surface velocimeter 300 may include two mirrors 316—one to redirect deflected laser beam 314 and a second one to redirect transmitted laser beam 312. In some embodiments, mirror 316 may redirect transmitted laser beam 312 and/or deflected laser beam 314 such that the two laser beams converge downstream. In some embodiments, transmitted laser beam 312 and deflected laser beam 314 may converge at a location of the object to be measured, such as a surface of the moving object. In some embodiments, laser surface velocimeter 300 may include a polarizer.

Rotated Laser

Described below are systems and methods of measuring moving objects that include a rotated laser beam profile as compared to that of conventional measurement methods. For example, a laser emitter may be rotated such that the laser beam profile of the emitted laser beam is oriented with its length orthogonal to the direction of travel of the moving object. (A length of the laser beam profile greater than a width of the laser beam profile). As used herein, the term "profile" with respect to a laser beam (e.g., a laser beam profile) refers to a cross-sectional area of the laser beam that is planar with a diameter of the beam, wherein the diameter is perpendicular to the beam axis of the laser beam.

A beam of light (e.g., a laser beam) can be defined by a beam axis, a first beam diameter (BD1), and a second beam diameter (BD2). As used herein, BD1 and BD2 are perpendicular to the beam axis of a beam of light, and BD1 and BD2 are perpendicular to each other.

In some embodiments, rotating the laser beam profile can generate a larger effective measurement area (i.e., the area where the transmitted beam and the deflected beam intersect at a surface of the moving object). In some embodiments, the laser beam profile may be elliptical in shape. In some embodiments, the laser beam can be rotated such that the long axis (i.e., BD1 or BD2 of the beam) of the ellipse of the elliptical profile is orthogonal to the direction of travel of the moving object that is to be measured.

Figure 6:
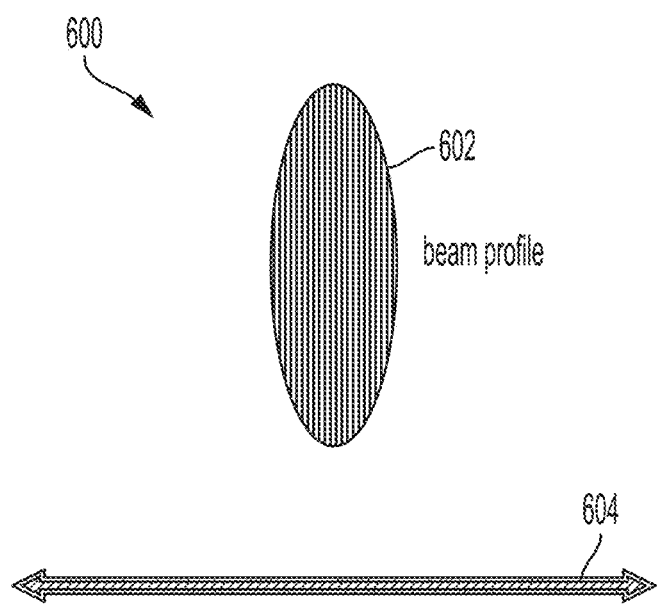
FIG. 6 shows a laser beam configuration according to some embodiments.

FIG. 6 depicts a configuration 600 including laser beam profile 602 that has been rotated such that the long axis (BD1) of the elliptical profile is perpendicular to the direction of object movement. Laser beam profile 602 is shown with a long axis (BD1) in the vertical direction (Y-axis) and a short axis (BD2) in the horizontal direction (X-axis). Moving object 604 is shown having a length in the horizontal direction (X-axis) and movement in the horizontal direction (X-axis). Thus, the rotated laser produces a beam profile 602 having a long axis (BD1) that is perpendicular to the movement of moving object 604.

Expanding Laser Beam Profile

Methods of measuring moving objects provided herein may include expanding the profile of the laser beam along one or more beam diameters. In some embodiments, expansion of the laser beam profile is achieved by using a cylindrical lens.

The expansion of the laser beam profile may be achieved without degrading the quality of the collimated light received from the laser. If the quality of the collimated light is degraded, it would compromise the accuracy consistency within the full depth of field of the laser surface velocimeter.

In some embodiments, the expansion of the laser beam profile does not compromise the accuracy of the measurements obtained using a laser surface velocimeter. In particular, if executed properly, the expansion of the profile will not alter the fringe patterns in the depth of field (as compared to an otherwise un-expanded laser beam profile).

In some embodiments, the laser beam profile may be expanded from 1.5 to 10 times or from 2 to 5 times its initial length. In some embodiments, the laser beam profile may be expanded more than 1.5 times, more than 2 times, more than 3 times, more than 4 times, more than 5 times, or more than 6 times its initial length. In some embodiments, the laser beam profile may be expanded less than 10 times, less than 8 times, less than 6 times, less than 5 times, less than 4 times, or less than 3 times its initial length. In some embodiments, the laser beam profile may be expanded in a single dimension. In some embodiments, the laser beam profile may be expanded in more than one dimension.

FIG. 5 shows a laser surface velocimeter 400 that includes an expanded laser beam profile according to some embodiments. As described above, laser surface velocimeter 500 can include laser diode 502, laser beam profile 504, moving object 506, and cylindrical lens 508.

Laser diode 502 may be rotated, as described in detail above, or laser diode 502 may be configured to emit a laser beam consistent with prior art (and not rotated).

Moving object 506, as shown in FIG. 5, may have a velocity direction that is horizontal, or along an X-axis. Accordingly, to prevent compromising the accuracy of measurements, laser bean profile 504 may be expanded in a Y-dimension and/or in a Z-dimension. In some embodiments, cylindrical lens 508 may be used to expand laser beam profile 504 in one or more dimensions. For example, as shown in FIG. 5, cylindrical lens 508 expands laser beam profile 504 at least in a vertical direction, or along a Y-axis.

Depth of Field

In some embodiments, methods of measuring moving objects provided herein may include a longer depth of field. In some embodiments, the depth of field may be expanded in a direction that is not the same as a velocity direction in which the material to be measured is moving. For example, if the material to be measured has a velocity direction along an X-axis, then the depth of field may be expanded in a Y-axis and/or in a Z-axis. As used herein, "depth of field" and "effective measurement area" (or "measurement area") may be used interchangeably. This area (i.e., depth of field, effective measurement area, or measurement area) is generated when a transmitted laser beam and a deflected laser beam converge and intersect, either partially or completely.

In the depth of field, a fringe pattern is created. For example, the light waves of the transmitted laser beam interfere with the light waves of the deflected laser beam to create interference fringes (e.g., alternating light and dark bands). This redistribution of light intensity creates an interference pattern. When these interference patterns are reflected off the surface of a material (e.g., a material to be measured), the reflected light creates high and low intensity levels of energy. These varying levels of energy are reflected into the laser surface velocimeter, and used to measure features, and more specifically, movement of the material. For example, the reflected energy is received by the laser surface velocimeter and may be directed onto a photo diode. The photo diode converts the energy from optical to electrical energy. The electrical energy is also known as a doppler signal because its frequency varies with the velocity of movement of the material from which the laser energy is reflected off of. This doppler signal is converted to a velocity based on the known calibrated fringe pattern geometry and compared in relation to time between the electrical crossing patterns received by the laser surface velocimeter.

Figure 7:
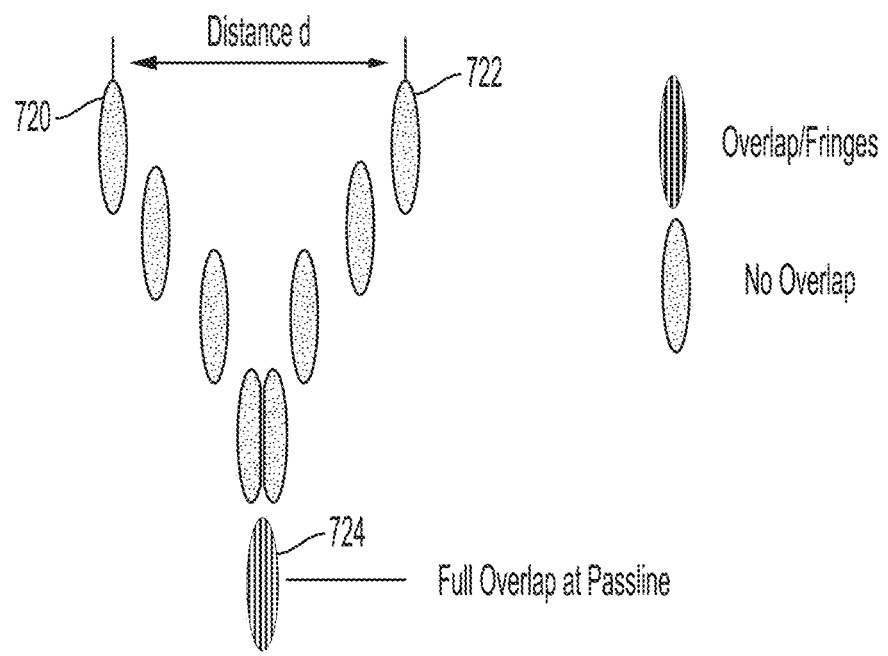
FIG. 7 shows converging laser beams that create a fringe pattern, according to some embodiments.

FIG. 7 shows a schematic of converging laser beams. As shown, laser beam 720 converges with laser beam 722 to intersect, creating a depth of field/effective measurement area 724. This depth of field/effective measurement area 724 includes a fringe pattern generated by the intersecting laser beams at the point of convergence. In some embodiments, the object or material to be measured is located within depth of field/effective measurement area 724. As shown in the figure, the laser beam profiles are rotated, consistent with laser beam profile 502 of FIG. 5.

Figure 8A:
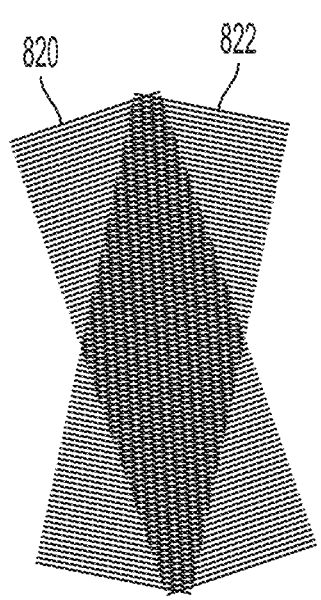
FIGS. 8A and 8B each depict a fringe pattern, according to some embodiments.
Figure 8B:
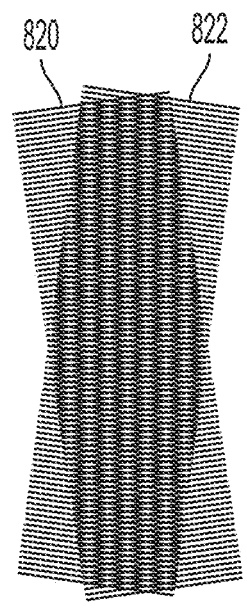

FIGS. 8A and 8B each show a fringe pattern generated by the intersecting of two laser beams. In FIG. 8A, laser beam 820 and laser beam 822 converge at an angle that is greater than the convergence angle represented in FIG. 8B. As shown in FIG. 8A, a large crossing (i.e., convergence) angle creates a smaller fringe pattern, or a shorter depth of field. Conversely, FIG. 8B shows a smaller crossing (i.e., convergence) angle, which creates a larger fringe pattern or a longer depth of field.

In some embodiments, the depth of field may be expanded to accommodate for the reduction in depth of field created by rotating the laser beam profile and/or by expanding the laser beam profile. For example, rotating the laser beam profile as described above can reduce the intersect range in the Z-axis due to the vertical laser beam profile (e.g., laser beam profile 504 of FIG. 5), instead of the horizontal laser beam profile of the prior art (e.g., laser beam profile 404 of FIG. 4).

In some embodiments, to accommodate for this shorter depth of field created by a rotated laser beam profile, a smaller angle may be used between the two laser beams to recover at least a portion of the depth that is otherwise lost due to the laser beam profile rotation. For example, a smaller angle between the two laser beams may be achieved minimizing the distance between a transmitted laser beam (e.g., transmitted laser beam 312 and a deflected laser beam 314 of FIG. 3). Minimizing this distance between the transmitted and deflected laser beams can minimize the convergence angle of the two laser beams.

In some embodiments, the convergence angle of the transmitted laser beam and the deflected laser beam may be from 5 to 40 degrees or from 10 to 30 degrees. In some embodiments, the convergence angle of the transmitted laser beam and the deflected laser beam may be more than 5 degrees, more than 10 degrees, more than 15 degrees, more than 20 degrees, more than 25 degrees, or more than 30 degrees. In some embodiments, the convergence angle of the transmitted laser beam and the deflected laser beam may be less than 40 degrees, less than 35 degrees, less than 30 degrees, less than 25 degrees, less than 20 degrees, less than 15 degrees, or less than 10 degrees.

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The invention claimed is:

1. A laser interferometry system comprising:
a laser emitter configured to emit a laser beam;
wherein the laser emitter is a rotated laser diode having a rotated laser beam profile;
a beam splitter configured to split the emitted laser beam into a first split beam directed towards a single deflector and a second split beam, wherein the first split beam comprises a first beam diameter and a second beam diameter, the first beam diameter being greater than the second beam diameter, and the second split beam comprises a third beam diameter and a fourth beam diameter, the third split beam diameter being greater than the fourth beam diameter; and
the single deflector configured to deflect the first split beam to intersect with the second split beam,
wherein the first beam diameter and the third beam diameter are parallel.

2. The system of claim 1, wherein the first beam diameter and the third beam diameter are equal and the second beam diameter and the fourth beam diameter are equal.

3. The system of claim 1, wherein the first split beam and the second split beam intersect at an angle of less than 60 degrees.

4. The system of claim 1, wherein the emitted laser beam comprises a fifth beam diameter and a sixth beam diameter, the fifth beam diameter being greater than the sixth beam diameter, and at least one of the fifth beam diameter or the sixth beam diameter is increased by passing the emitted laser beam through a cylindrical lens.

5. The system of claim 1, wherein the first beam diameter is at least three times greater than second beam diameter, and the third beam diameter is at least three times greater than the fourth beam diameter.

6. The system of claim 1, comprising a processor, a memory, and instructions stored on the memory configured to cause the system to calculate a velocity of an object moving through the intersecting area.

7. The system of claim 6, wherein the calculated velocity is in a direction orthogonal to the first beam diameter and the third beam diameter.

8. The system of claim 6, wherein the object comprises a cord, wire, rod, or a flat sheet of paper or plastic.

9. The system of claim 1, wherein the beam splitter is a single beam splitter.

10. The system of claim 1, further comprising a single cylindrical lens.

11. The system of claim 1, wherein the beam splitter is a single beam splitter, and further comprising a single cylindrical lens.

12. The system of claim 1, wherein the laser beam profile is expanded from 1.5 to 10 times its initial length.

13. The system of claim 1, wherein the laser beam profile may be expanded in a single dimension.

14. The system of claim 1, wherein the laser beam profile may be expanded in more than one dimension.

15. A laser interferometry system comprising:
a laser emitter configured to emit a laser beam;

wherein the laser emitter is a rotated laser diode having a rotated laser beam profile;

a beam splitter configured to split the emitted laser beam into a first split beam directed towards a single deflector and a second split beam, wherein the first split beam comprises a first beam diameter and a second beam diameter, the first beam diameter being greater than the second beam diameter, and the second split beam comprises a third beam diameter and a fourth beam diameter, the third beam diameter being greater than the fourth beam diameter; and the single deflector configured to deflect the first split beam to intersect with the second split beam, wherein the emitted laser beam comprises a fifth beam diameter and a sixth beam diameter, the fifth beam diameter being greater than the sixth beam diameter, and at least one of the fifth beam diameter or the sixth beam diameter is increased by passing the emitted laser beam through a cylindrical lens.

16. The system of claim 15, wherein the first beam diameter and the third beam diameter are parallel.

17. The system of claim 15, wherein the first beam diameter and the third beam diameter are equal and the second beam diameter and the fourth beam diameter are equal.

18. The system of claim 15, wherein the first split beam and the second split beam intersect at an angle of less than 60 degrees.

19. The system of claim 15, wherein the first beam diameter is at least three times greater than second beam diameter, and the third beam diameter is at least three times greater than the fourth beam diameter.

20. The system of claim 15, comprising a processor, a memory, and instructions stored on the memory configured to cause the system to calculate a velocity of an object moving through the intersecting area.

21. The system of claim 20, wherein the calculated velocity is in a direction orthogonal to the first beam diameter and the third beam diameter.

22. The system of claim 20, wherein the object comprises a cord, wire, rod, or a flat sheet of paper or plastic.

23. A laser interferometry system comprising:
a laser emitter configured to emit a laser beam;
wherein the laser emitter is a rotated laser diode having a rotated laser beam profile;
a beam splitter configured to split the emitted laser beam into a first split beam directed towards a single deflector and a second split beam, wherein the first split beam comprises a first beam diameter and a second beam diameter, the first beam diameter being greater than the second beam diameter, and the second split beam comprises a third beam diameter and a fourth beam diameter, the third split beam diameter being greater than the fourth beam diameter; and
the single deflector configured to deflect the first split beam to intersect with the second split beam,
wherein the first split beam and the second split beam intersect at an angle of less than 60 degrees.

24. The system of claim 23, wherein the first beam diameter and the third beam diameter are equal and the second beam diameter and the fourth beam diameter are equal.

25. The system of claim 23, wherein the first split beam and the second split beam intersect at an angle of less than 20 degrees.

26. The system of claim 23, wherein the first beam diameter and the third beam diameter are parallel.

27. The system of claim 23, wherein the emitted laser beam comprises a fifth beam diameter and a sixth beam diameter, the fifth beam diameter being greater than the sixth beam diameter, and at least one of the fifth beam diameter or the sixth beam diameter is increased by passing the emitted laser beam through a cylindrical lens.

28. The system of claim 23, wherein the first beam diameter is at least three times greater than second beam diameter, and the third beam diameter is at least three times greater than the fourth beam diameter.

29. The system of claim 23, comprising a processor, a memory, and instructions stored on the memory configured to cause the system to calculate a velocity of an object moving through the intersecting area.

30. The system of claim 29, wherein the calculated velocity is in a direction orthogonal to the first beam diameter and the third beam diameter.

31. The system of claim 29, wherein the object comprises a cord, wire, rod, or a flat sheet of paper or plastic.

* * * * *